April 23, 1946.   G. H. BURRELL ET AL   2,399,095
METHOD OF SELECTIVE ADSORPTION OF GASES
Filed Dec. 24, 1942
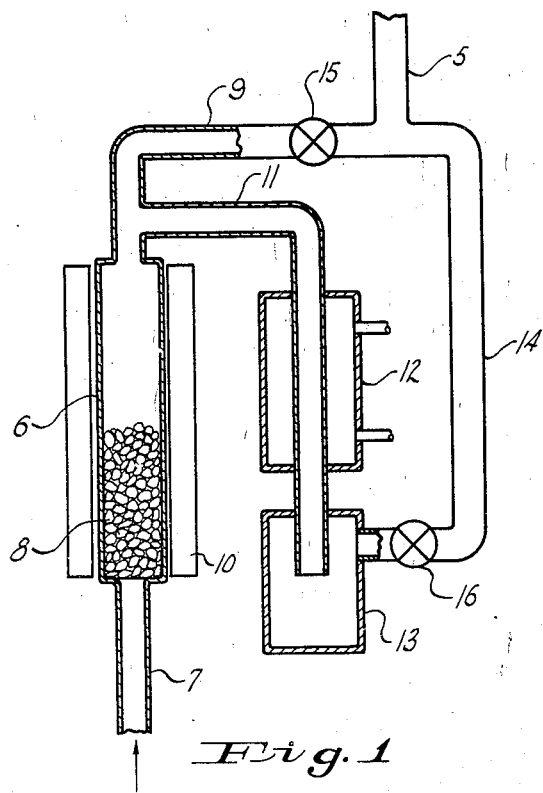
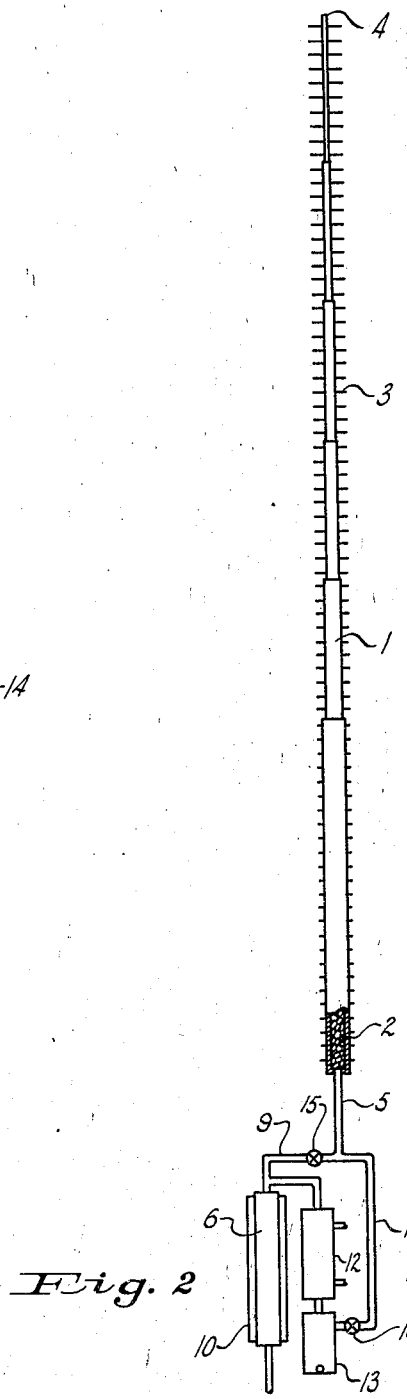
Fig. 1
Fig. 2
INVENTOR.
BY Guy H. Burrell
   Lloyd V. Guild
William B. Jaspert
Attorney.

Patented Apr. 23, 1946

2,399,095

UNITED STATES PATENT OFFICE 2,399,095

METHOD OF SELECTIVE ADSORPTION OF GASES

Guy H. Burrell, Mount Lebanon, and Lloyd V. Guild, Oakland, Pa., assignors to Burrell Technical Supply Company, Pittsburgh, Pa., a corporation of Pennsylvania Application December 24, 1942, Serial No. 469,994

1 Claim. (Cl. 183—114.2)

This invention relates to a method of fractionating hydrocarbon gases and liquids employing activated charcoal as the adsorbing medium and more particularly to the treatment of the adsorbing medium used in the fractionating column for adsorbing hydrocarbons preliminary to the successive distillation of the different hydrocarbon gases.

The method of treating the charcoal may also be employed in recovery systems to more readily desorb the adsorbed gases.

Certain higher hydrocarbons, including octane, nonane and heptane are readily adsorbed by activated cocoanut charcoal but cannot be desorbed by the conventional methods such as subjecting the charcoal to treatment with steam or mercury vapor, to which the lower hydrocarbons such as methane, ethane, ethylene and propane respond.

The effect of accumulation of the higher hydrocarbons is to diminish the adsorption capacity of the charcoal to the point where finally the charcoal must be discarded or reactivated, and in fractionating columns for gas analysis considerable error is introduced in the analysis. Because of the inability to desorb the higher hydrocarbons, it is not possible to distill these gases in recovery systems or in fractionating columns, such as are employed in making analysis of gas samples.

To permit complete desorption of higher hydrocarbons by ordinary methods such as treatment with steam, hot gases or mercury vapor, an adsorption medium that will not hold the hydrocarbons too tightly must be employed.

We have discovered that treatment of activated charcoal with a controlled salt solution will inhibit the tightness with which the higher hydrocarbons are held and will permit complete desorption by ordinary methods.

We have found that a suitable solution for the treatment of charcoal is one containing 10% by weight of sodium chloride in water, charcoal treated with such a solution being subsequently dried at a temperature of 110° C. Other salts and different strengths of solution may also be effective. Activated charcoal treated with a 10% salt solution is especially useful in the fractional distillation of hydrocarbon gases in fractionating columns when employed in connection with gas analysis systems wherein it is necessary to quantitatively recover the heavy hydrocarbons to complete the analysis.

In such systems it is impossible to desorb the higher hydrocarbons from the normal grade of charcoal by the methods employed in desorbing the lower hydrocarbons. This is also true in recovery systems employing charcoal wherein the higher hydrocarbons are adsorbed in preference to the lower, and thus recovery becomes an economic problem.

In the practical adaptation of the salted activated charcoal to fractional distillation systems, the salted charcoal may be placed in a separate container and so connected to the fractionating column that the lower hydrocarbons will pass through the charcoal treated with the salt solution into the column as the sampling progresses, the higher hydrocarbons being adsorbed by the salted charcoal. The higher hydrocarbons may then be distilled out of the salted charcoal by the ordinary methods and collected as a liquid.

This method is illustrated in the accompanying drawing constituting a part hereof in which like reference characters designate like parts and in which:

Fig. 1 is a vertical cross-sectional view partially in elevation of a separate container employed in connection with a fractionating column; and Fig. 2 a front elevational view partially in section of the apparatus of Fig. 1, connected to a fractionating column.

The numeral 1 designates a fractionating column containing activated charcoal 2, the column being provided with fins 3 to enlarge the heating area through which heat is transmitted in any suitable manner, as by a circular heater (not shown) which may be moved upward of the column as the distillation progresses. The upper end 4 of the column is connected to the gas measuring and classifying system (not shown) and the gas sample to be analyzed is passed into the bottom of the column through conduit 5.

As hereinbefore stated, the sample is first passed through a separate container 6 at the inlet 7, the chamber 6 containing activated charcoal 8 treated with a salt solution, and the higher hydrocarbons are adsorbed by the charcoal 8 with the lower hydrocarbons passing through the salted charcoal directly through conduit 9 to the inlet 5 of the fractionating column 1.

The container 6 is surrounded by a heater 10 which is preferably an electrical resistance heater, and the higher hydrocarbons collected in the salted charcoal are distilled and passed through conduit 11 through a condenser generally designated by the numeral 12, from which they are collected as a liquid in a container 13. Any of the lower hydrocarbons pass through conduit 14 to the inlet 5 of the fractionating column for subsequent desorption.

Valves 15 and 16 are provided to control the flow of the gases through the required conduits. Instead of the separate container 6, salted charcoal may be employed in the lower intake end of the column 1 and the remainder of the container of the column filled with active adsorbent. If so arranged, the treated and untreated charcoal would not be in contact but an offtake from the treated charcoal would lead the gases through a condenser and thence to the untreated charcoal.

The salted charcoal will absorb the higher hydrocarbons and the lower hydrocarbons will pass into the active charcoal during distillation. The salted charcoal may likewise be employed in recovery systems wherein the lower hydrocarbons will at first be adsorbed as the gas passes through, but gradually displaced by the higher hydrocarbons. When the charcoal is saturated, ordinary methods may be employed in desorption and recovery, such as the steam method hereinbefore mentioned.

It will be evident from the foregoing description of the invention that activated charcoal treated in a water solution containing 10% by weight of sodium chloride and dried at a temperature of 110° C. may be readily desorbed by ordinary methods without the necessity for reactivating the carbon, and that by the use of the salted charcoal, the higher and lower hydrocarbons may be separated when charged into the fractionating column to speed up the gas analysis process.

Although one embodiment of the invention has been herein illustrated and described, it will be evident to those skilled in the art that various modifications may be made in the details of my method without departing from the principles herein set forth.

We claim:

The method of separating gases in a fractionating column containing activated charcoal which comprises initially passing the gases through a separate container, charged with activated charcoal treated with a salt solution and dried, to adsorb the higher hydrocarbons and passing the lower hydrocarbons directly to the bottom of the fractionating column, heating the treated charcoal through which the gases initially pass to desorb the higher hydrocarbons, passing the distilled gases through a condenser to liquify the same and permitting any uncondensed gases to pass to the bottom of said fractionating column and progressively heating the charcoal in the fractionating column from the bottom to the top thereof to release the adsorbed gases in the order of their occurrence in said column.

GUY H. BURRELL.
LLOYD V. GUILD.